Patented Apr. 29, 1924.

1,492,241

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

METHOD OF RECOVERING SCRAP BATTERY PLATES.

No Drawing. Application filed December 4, 1920. Serial No. 428,368.

*To all whom it may concern:*

Be it known that I, CAMPBELL C. CARPENTER, a citizen of the United States, residing at Niagara Falls, in the county of Niagara and State of New York, have invented new and useful Improvements in Methods of Recovering Scrap Battery Plates, of which the following is a specification.

The present invention relates to methods of recovering scrap battery plates.

It is common practice at the present time, in connection with the recovery of lead from scrap battery plates, to place said plates in a reverbatory or blast furnace with suitable fluxes and subject same to the necessary heat and reducing atmosphere (as for example, carbon monoxide) whereby the metallic lead is melted and the compounds of lead represented by the active material are reduced in part to metallic lead and melted. This process is inefficient and costly in operation, there being a great loss of lead through volatilization and slag. Due to the high cost of recovery and the loss by volatilization and slag, the market price of scrap material is much less than the market price of lead.

An object of the present invention is to provide a method of recovering battery material which will lower the cost of recovery.

A further object is to provide a method of treating scrap battery plates which will produce a product having a relatively high market value.

Further objects will appear as the description proceeds.

According to the present invention, the scrap plates are subjected to a low heat sufficient to melt the lead or lead alloy of the plates. The remaining material, i. e., the active material, which, according to the old method, would be subjected to a relatively high temperature in presence of suitable fluxes and reducing atmosphere for the purpose of reducing same to metallic lead, is placed in a furnace and is treated with heat and air, whereby said material is oxidized in greater part into lead oxide, which has a relatively high market value.

One embodiment of the present invention has been described in detail. Many modifications will occur to those skilled in the art. It is intended in this patent to cover all such modifications that come within the scope of the invention as defined by the appended claim.

What I claim as new and desire to secure by Letters Patent of the United States is—

The method of treating scrap battery plates which consists in melting the metallic lead, separating the molten lead from the remaining material and then subjecting the remaining material to oxidizing conditions to produce lead oxide.

In witness whereof, I have hereunto subscribed my name.

CAMPBELL C. CARPENTER.